United States Patent
Prakash et al.

(10) Patent No.: US 11,595,974 B2
(45) Date of Patent: Feb. 28, 2023

(54) INTRA-USER EQUIPMENT TRAFFIC PRIORITIZATION ON UPLINK WITH MEDIUM ACCESS CONTROL-PHYSICAL (MAC-PHY) LAYER INTERACTION

(71) Applicant: QUALCOMM Incorporated, San Diego, CA (US)

(72) Inventors: Rajat Prakash, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/215,337

(22) Filed: Mar. 29, 2021

(65) Prior Publication Data

US 2021/0314971 A1  Oct. 7, 2021

Related U.S. Application Data

(60) Provisional application No. 63/003,792, filed on Apr. 1, 2020.

(51) Int. Cl.
*H04W 72/12* (2009.01)
*H04W 72/14* (2009.01)
(Continued)

(52) U.S. Cl.
CPC ......... *H04W 72/1242* (2013.01); *H04L 1/189* (2013.01); *H04W 8/24* (2013.01); *H04W 72/14* (2013.01); *H04W 80/02* (2013.01)

(58) Field of Classification Search
None
See application file for complete search history.

(56) References Cited

U.S. PATENT DOCUMENTS

| 11,382,114 B2 * | 7/2022 | Fu ................... H04W 72/042 |
| 2020/0154469 A1 * | 5/2020 | Chin .................. H04L 1/0003 |

(Continued)

FOREIGN PATENT DOCUMENTS

| WO | WO-2020144403 A1 * | 7/2020 | |
| WO | WO-2020168223 A1 * | 8/2020 | ............... H04L 1/08 |

(Continued)

OTHER PUBLICATIONS

Fujitsu: "Consideration on Standardization Impacts of Intra-UE Prioritization", 3GPP Draft, 3GPP TSG-RAN WG2 Meeting #105bis, R2-1905211 (R2-1904986), 3rd Generation Partnership Project (3GPP), Xi 'an, China, Apr. 8-12, 2019, XP051709678, pp. 1-6, Retrieved from the Internet: URL:http://www.3gpp.org/ftp/tsg%5Fran/WG2%5FRL2/TSGR2%5F105bis/Docs/R2%2D1905211%2Ezip [retrieved on Apr. 12, 2019].

(Continued)

*Primary Examiner* — Anh Vu H Ly
(74) *Attorney, Agent, or Firm* — Seyfarth Shaw LLP/Qualcomm Incorporated

(57) ABSTRACT

A method of wireless communication by a UE (user equipment) includes receiving, from a MAC (media access control) layer, a first configured grant PDU (protocol data unit). The method also includes receiving, from the MAC layer, a second configured grant PDU. The method also includes determining whether a conflict exists between the first configured grant PDU and the second configured grant PDU. The method further includes triggering, at the MAC layer, a retransmission procedure for the second configured grant PDU when the conflict exists. The triggering can occur in response to receiving a message indicating failure to send.

18 Claims, 6 Drawing Sheets

(51) Int. Cl.
*H04L 1/1867* (2023.01)
*H04W 8/24* (2009.01)
*H04W 80/02* (2009.01)

(56) References Cited

U.S. PATENT DOCUMENTS

| | | | |
|---|---|---|---|
| 2021/0105812 A1* | 4/2021 | Rastegardoost | H04L 1/08 |
| 2021/0269934 A1* | 9/2021 | Takeuchi | C25D 13/20 |
| 2021/0378005 A1* | 12/2021 | Marco | H04W 72/14 |
| 2022/0109486 A1* | 4/2022 | Fu | H04W 72/1242 |
| 2022/0210823 A1* | 6/2022 | Alfarhan | H04L 1/1887 |
| 2022/0217760 A1* | 7/2022 | Iyer | H04L 5/003 |

FOREIGN PATENT DOCUMENTS

| | | | | |
|---|---|---|---|---|
| WO | WO-2020194258 A1 * | 10/2020 | | H04L 1/1812 |
| WO | WO-2020222215 A1 * | 11/2020 | | H04L 1/1887 |

OTHER PUBLICATIONS

International Search Report and Written Opinion—PCT/US2021/024955—ISAEPO—dated Jul. 16, 2021.

LG Electronics Inc: "UL Data Prioritization for the DG/CG Conflict and the CG/CG Conflict", 3GPP Draft, 3GPP TSG-RAN WG2 Meeting #105bis, R2-1905016, 3rd Generation Partnership Project (3GPP), Xi'an, China, Apr. 8-12, 2019, XP051694203, pp. 1-3, Retrieved from the Internet: URL:http://www.3gpp.org/ftp/tsg%5Fran/WG2%5FRL2/TSGR2%5F105bis/Docs/R2%2D1985016%2Ezip [retrieved on Mar. 29, 2019].

* cited by examiner ures and

INTRA-USER EQUIPMENT TRAFFIC PRIORITIZATION ON UPLINK WITH MEDIUM ACCESS CONTROL-PHYSICAL (MAC-PHY) LAYER INTERACTION

CROSS REFERENCE TO RELATED APPLICATION

The present application claims the benefit of U.S. Provisional Patent Application No. 63/003,792, filed on Apr. 1, 2020, and titled "INTRA-USER EQUIPMENT TRAFFIC PRIORITIZATION ON UPLINK WITH MEDIUM ACCESS CONTROL-PHYSICAL (MAC-PHY) LAYER INTERACTION," the disclosure of which is expressly incorporated by reference in its entirety.

FIELD OF THE DISCLOSURE

Aspects of the present disclosure generally relate to wireless communications, and more particularly to techniques and apparatuses for intra-user equipment traffic prioritization on the uplink, with medium access control-physical (MAC-PHY) layer interaction.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method of wireless communication by a UE (user equipment) includes receiving, from a MAC (media access control) layer, a first configured grant PDU (protocol data unit). The method also includes receiving, from the MAC layer, a second configured grant PDU. The method includes transmitting from a PHY (physical) layer to the MAC layer, a failure indication for the second configured grant PDU when a conflict exists between the first configured grant PDU and the second configured grant PDU. The failure indication triggers a retransmission procedure, at the MAC layer, for the second configured grant PDU.

In another aspect of the present disclosure, an apparatus of a UE (user equipment) for wireless communications includes a memory and at least one processor operatively coupled to the memory. The apparatus is configured to receive, from a MAC (media access control) layer, a first configured grant PDU (protocol data unit) and a second configured grant PDU. The apparatus is further configured to transmit from a PHY (physical) layer to the MAC layer, a failure indication for the second configured grant PDU when a conflict exists between the first configured grant PDU and the second configured grant PDU. The failure indication triggers a retransmission procedure, at the MAC layer, for the second configured grant PDU.

In another aspect of the present disclosure, a UE includes means for receiving, from a MAC (media access control) layer, a first configured grant PDU (protocol data unit). The UE also includes means for receiving, from the MAC layer, a second configured grant PDU. The UE also includes means for transmitting from a PHY (physical) layer to the MAC layer, a failure indication for the second configured grant PDU when a conflict exists between the first configured grant PDU and the second configured grant PDU. The failure indication triggers a retransmission procedure, at the MAC layer, for the second configured grant PDU.

In another aspect of the present disclosure, a non-transitory computer-readable medium with program code recorded thereon is disclosed. The program code is executed by a UE and includes program code to receive, from a MAC (media access control) layer, a first configured grant PDU (protocol data unit) and a second configured grant PDU. The UE also includes program code to transmit from a PHY (physical) layer to the MAC layer, a failure indication for the second configured grant PDU when a conflict exists between the first configured grant PDU and the second configured grant PDU. The failure indication triggers a retransmission procedure, at the MAC layer, for the second configured grant PDU.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
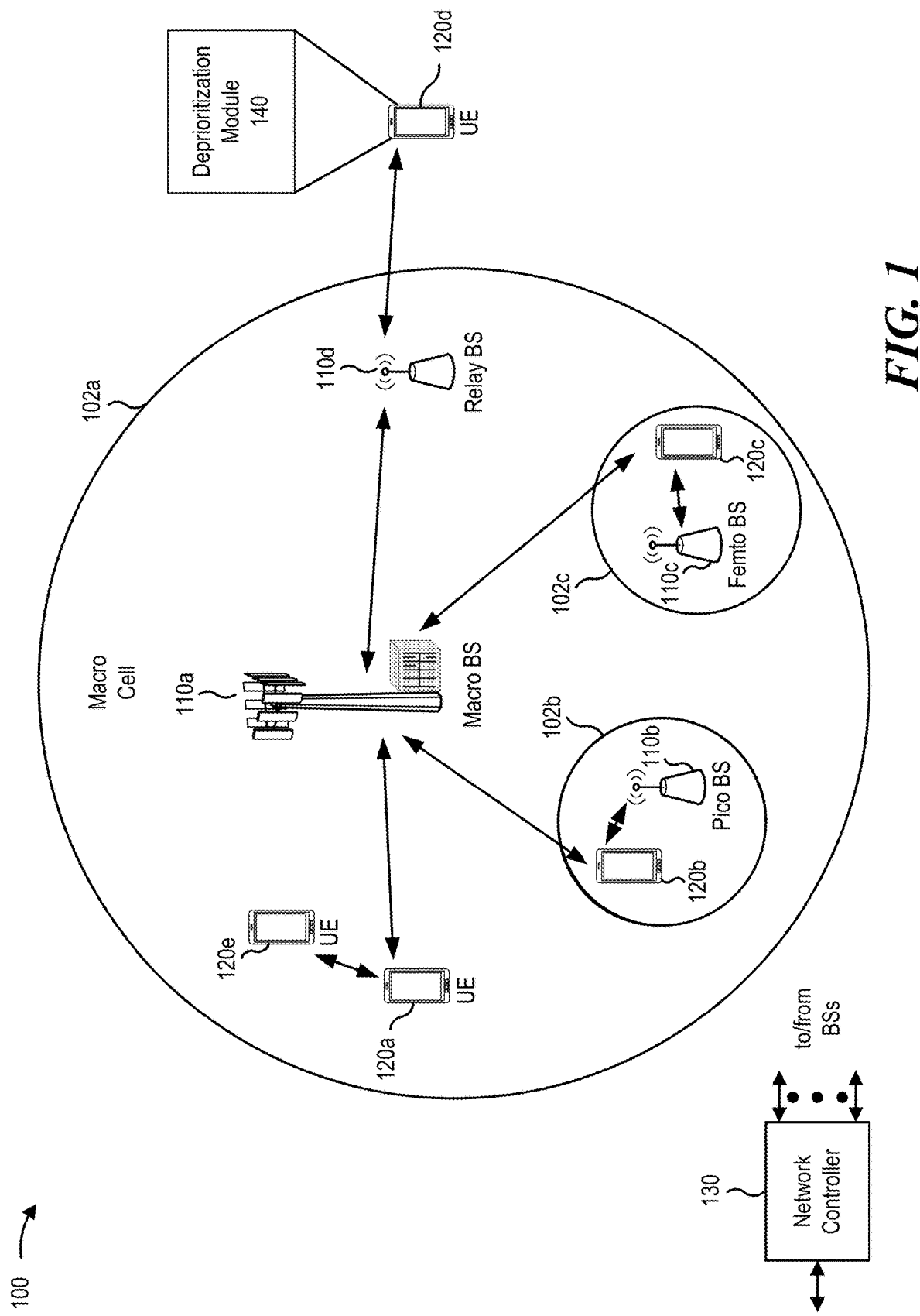
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

The present disclosure generally relates to handling collisions in scheduled wireless communications. In certain wireless communication technologies, such as Third Generation Partnership Project (3GPP), long term evolution (LTE), fifth generation (5G) new radio (NR), etc., base stations can schedule devices for communicating via configuration of one or more resource grants. There can be multiple types of resource grants defined and available in a given wireless communication technology, such as configured grants (CGs) and dynamic grants (DGs). In 5G, for example, a base station (e.g., gNB) can semi-statically schedule a CG for a device (e.g., a user equipment (UE)) using radio resource control (RRC) signaling. The CG may be defined over certain resources and may be associated with a periodic or other trigger-based allocation. LTE similarly defines semi-persistent scheduling (SPS) grants.

In response to receiving a grant, for example a configured grant, a UE prepares a protocol data unit (PDU) for uplink transmission to a base station. The UE generates the PDU in a media access control (MAC) layer, provides the PDU to a physical (PHY) layer, processes the PDU in the PHY layer for transmission, and eventually transmits the PDU on the uplink. With increasing usage of intra-UE prioritization, an increasing number of PDUs may be preempted during handling by the PHY layer. For example, PDU handling may be interrupted due to a higher-priority grant being received for the same grant occasion, a new scheduling request with higher priority being transmitted by the UE for the same grant occasion, and/or the like.

Sometimes the MAC layer processes a grant and delivers a grant to the PHY layer, but the de-prioritization happens later at the PHY layer due to processing, a timeline, or other limitations. For example, a grant with high priority may be delivered to the PHY layer, but the PHY layer may be unable to transmit the PDU because the PHY layer is transmitting a low (or equal) priority grant for which it is too late to stop or cancel the transmission. In this example, the grant being de-prioritized is actually a higher priority grant at the MAC layer, although the two grants may be the same priority at the PHY layer. The difference in priorities may occur because the PHY layer has a two level priority, whereas the MAC layer has a multi-level priority.

To address the PHY layer conflicts, according to some aspects of the present disclosure, the PHY layer in the UE sends a 'failure' indication to the MAC layer in the UE, causing the UE to use the next configured grant occasion to transmit the PDU. The 'failure' indication allows recovery of the PDU at the MAC layer for a grant that the PHY layer was unable to transmit.

In some aspects of the present disclosure, the PHY layer determines that a configured grant transmission is not possible due to a conflict with another transmission that is in process or in preparation. As a result, the PHY layer may send the indication of failure to the MAC layer. In other aspects of the present disclosure, a timeline is defined for generating and sending a second PDU (e.g., associated with a second configured occasion of the same priority.) The timeline may be used by the PHY layer or MAC layer to determine whether a failure or conflict occurs. Thus, the UE is able to recover PDUs at the MAC layer for a preempted PDU the PHY layer was unable to transmit.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

The UE 120 may include a de-prioritization module 140. Although a single UE 120 is shown to include the de-prioritization module, any number of UEs 120 may include the de-prioritization module 140. The de-prioritization module 140 may receive, from a MAC (media access control) layer, a first configured grant PDU (protocol data unit) and a second configured grant PDU. The de-prioritization module 140 may transmit from a PHY (physical) layer to the MAC layer, a failure indication for the second configured grant PDU when a conflict exists between the first configured grant PDU and the second configured grant PDU. The failure indication triggers a retransmission procedure, at the MAC layer, for the second configured grant PDU.

As indicated above, FIG. 1 is provided merely as an example. Other examples may differ from what is described with regard to FIG. 1.

Figure 2:
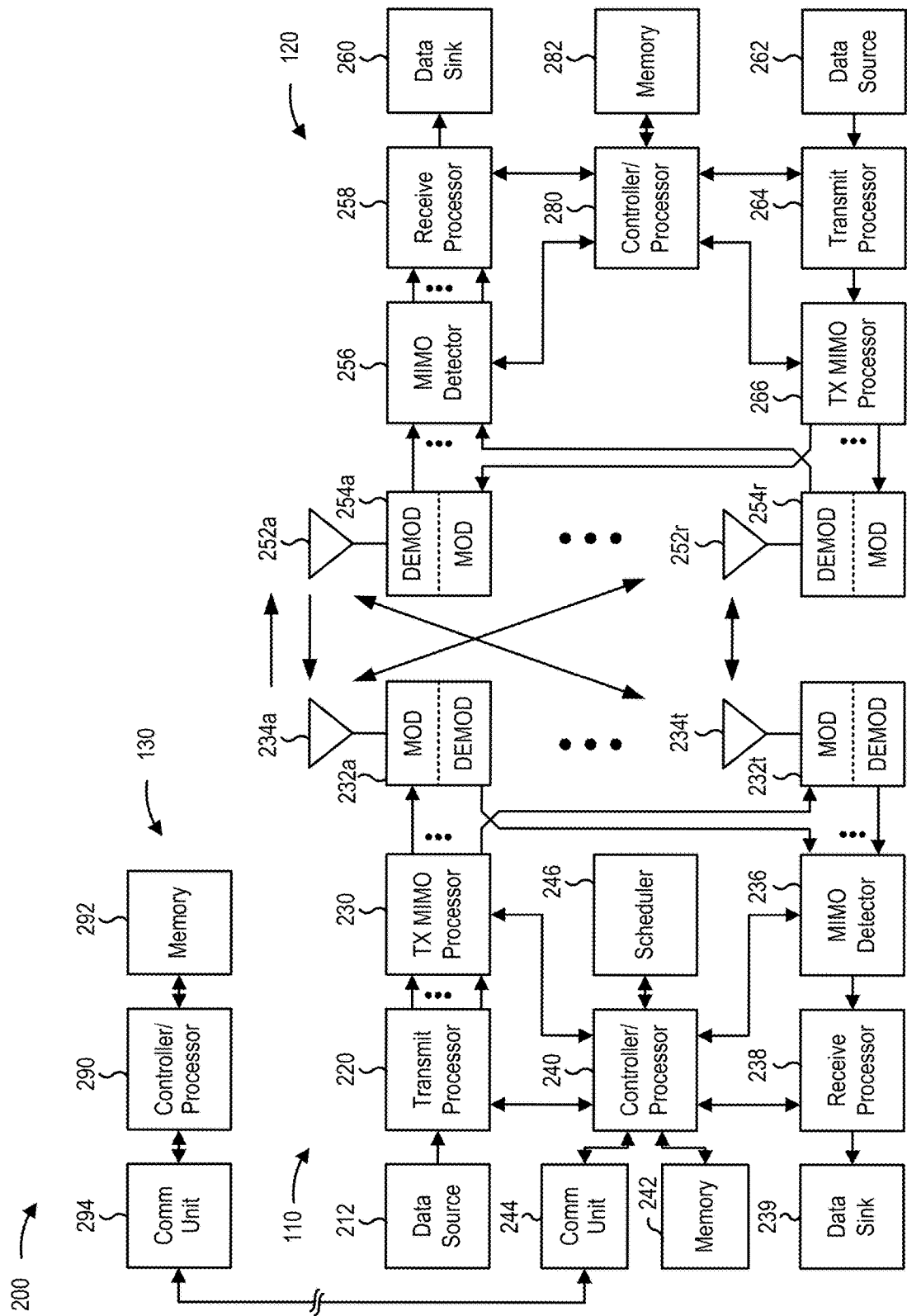
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 280 of the UE 120, and/or any other component(s) of FIG. 2 may perform one or more techniques associated with de-prioritization handling, as described in more detail elsewhere. For example, the controller/processor 280 of the UE 120, and/or any other component(s) of FIG. 2 may perform or direct operations of, for example, the processes of FIG. 6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for determining, means for triggering, means for transmitting, means for signaling, and means for interrupting. Such means may include one or more components of the UE 120 described in connection with FIG. 2.

As indicated above, FIG. 2 is provided merely as an example. Other examples may differ from what is described with regard to FIG. 2.

As noted above, the MAC layer of a UE processes a grant and delivers the grant and associated protocol data unit (PDU) to the physical (PHY) layer of the UE. De-prioritization of the PDU, however, may occur at the PHY layer due to processing (or other) limitations. To address the PHY layer conflicts, according to aspects of the present disclosure, the PHY layer sends a failure indication to the MAC layer. The failure indication may be triggered by the PHY layer fully or partially failing to transmit the PDU. The failure indication causes the UE to use the next configured grant occasion to transmit the PDU. The failure indication allows recovery of the PDU at the MAC layer for a PDU that the PHY layer was unable to transmit with the initial configured grant occasion.

In aspects of the present disclosure, the PHY layer in the UE determines that a configured grant transmission is not possible due to a conflict with another transmission that is in process or in preparation. The PHY layer in the UE sends the indication of failure to the MAC layer in the UE, as seen in FIG. 3.

Figure 3:
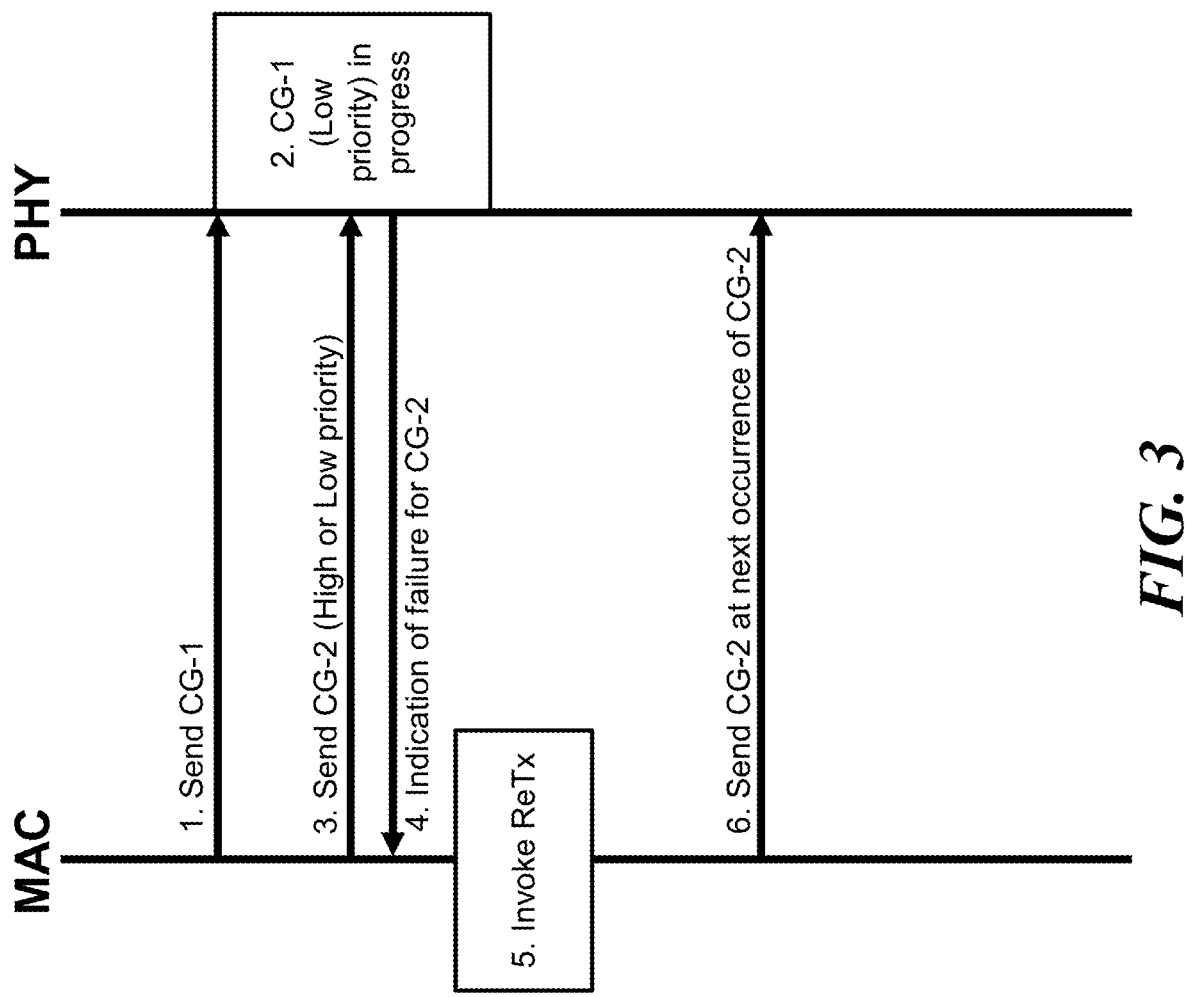
FIG. 3 illustrates an example call flow for PHY (physical) layer collision handling, in accordance with certain aspects of the present disclosure.

FIG. 3 illustrates an example call flow for PHY layer collision handling, according to aspects of the present disclosure. FIG. 3 shows failure indication and subsequent retransmission. At time 1, a MAC layer sends a PDU associated with configured grant 1 (CG-1). At time 2, a PHY layer processes the PDU and prepares it for transmission in the next available CG occasion. In the example of FIG. 3, the PDU for CG-1 is a low priority PDU. At time 3, the MAC layer sends a PDU associated with CG-2 to the PHY layer before the PHY layer finishes transmission of the PDU associated with CG-1. Due to the conflict, at time 4, the PHY layer sends a failure indication for the PDU associated with CG-2.

At time 5, the MAC layer invokes a retransmission (ReTx) procedure for the PDU associated with CG-2. That is, the MAC layer of the UE uses the failure indication to trigger retransmission procedures for the preempted configured grant. At time 6, the MAC layer sends the PDU associated with CG-2 to the PHY layer for transmission at the next available CG occasion. Every configured grant has its own periodicity (e.g., 5 or 10 msec). Thus, the MAC layer may attempt to retransmit at the next occurrence for the failed configured grant transmission.

In other aspects of the present disclosure, a timeline is defined for generating and sending a second PDU (e.g., associated with a second CG-PUSCH (configured grant-physical uplink shared channel) occasion) of the same RRC (radio resource control) priority. The timeline may be used by the PHY layer to determine whether a failure or conflict occurs.

Figure 4:
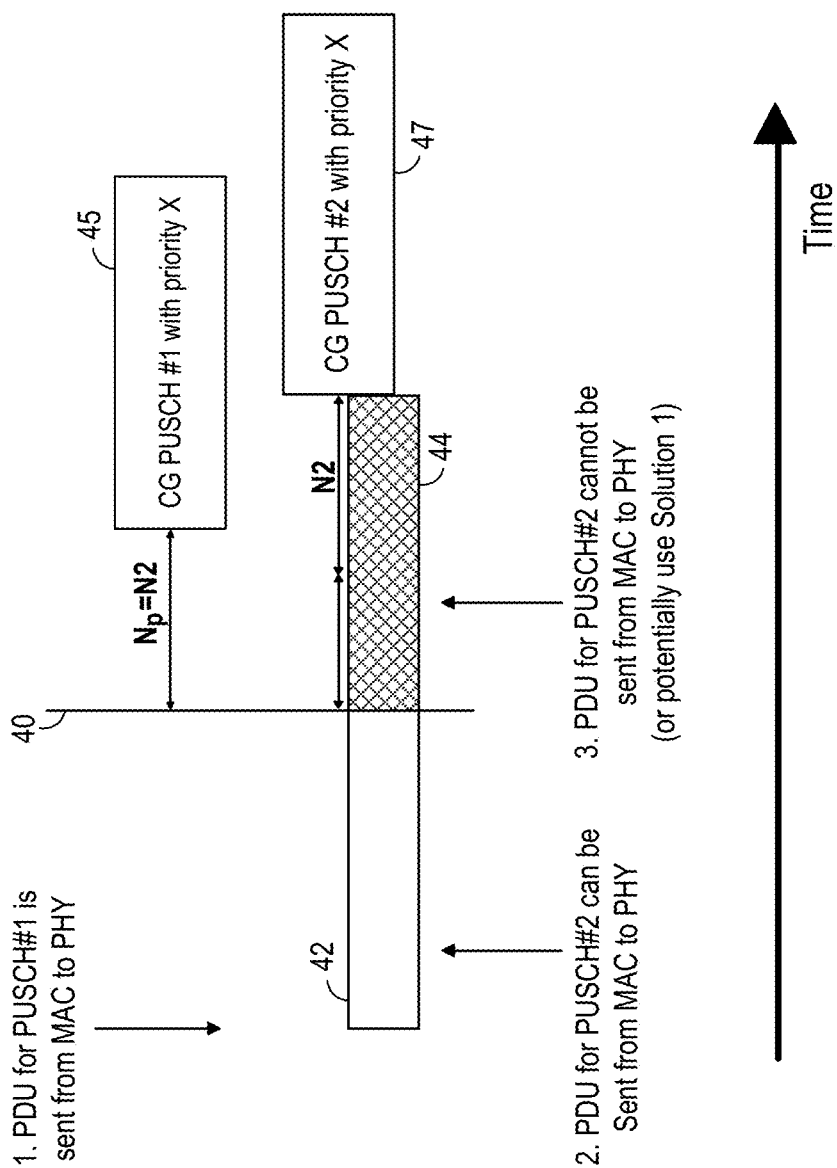
FIG. 4 is a timing diagram illustrating a timeline for PHY layer collision handling, in accordance with aspects of the present disclosure.

FIG. 4 is a timing diagram illustrating a timeline for PHY layer collision handling, in accordance with aspects of the present disclosure. As seen in FIG. 4, the second PDU (e.g., associated with PUSCH#2) may be transmitted by the PHY layer if it is received from the MAC layer before a pre-designated time 40 with respect to a first PDU (e.g., associated with PUSCH#1).

More specifically, at time 1, the MAC layer transmits a PDU for PUSCH#1 to the PHY layer. The PDU for PUSCH#1 is associated with a first CG PUSCH occasion 45 (CG PUSCH #1). The PDU for PUSCH#1 has a priority X. A pre-designated time (prioritization time) Np before the start of the first CG PUSCH occasion 45 (CG PUSCH#1) is shown in FIG. 4 by reference number 40. In the example of FIG. 4, the prioritization time Np=N2, where N2 is defined in the standard as a minimum processing timeline for the carrier of interest. N2 is a constant that is a function of the PHY layer characteristics.

The prioritization time Np is not limited to this value and may have other values. In one configuration, the time Np is explicitly signaled to the UE from a network device. For example, the time Np may be signaled at multi-level quantized values, such as with RRC signaling. If a single value is to be signaled (e.g., if Np=N2), the time Np may be implicitly signaled.

Referring again to FIG. 4, in a first example, the MAC layer transmits a PDU for PUSCH#2 to the PHY layer at time 2. The PDU for PUSCH#2 is associated with a second CG occasion 47 (CG PUSCH #2) and has the same priority X as the PDU for PUSCH#1. In the first example of FIG. 4, at time 2, the MAC layer sends the PDU for PUSCH#2 before the pre-designated time 40 (e.g., in a region 42). In this example, PUSCH#1 does not have to be interrupted because the PHY layer did not start processing of PUSCH#1 before receiving the PDU for PUSCH#2. Therefore, the PDU for PUSCH#2 can be sent in the second CG occasion 47 (CG PUSCH#2). If for some reason, however, transmission of the PDU for PUSCH#1 fails, the MAC layer may recover the PDU for PUSCH#1 using retransmission of de-prioritized grants, as described with respect to FIG. 3.

By defining the time constraint, an ongoing transmission does not have to be interrupted. In a second example shown in FIG. 4, when the MAC layer transmits the PDU for PUSCH#2 to the PHY layer, at time 3, which is after the pre-designated time 40 (e.g., transmission occurring in a region 44 of FIG. 4), the PHY layer does not send the PDU for PUSCH#2. Thus, the MAC layer may be prevented from transmitting the PDU for PUSCH#2. In other aspects, the MAC layer transmits the PDU for PUSCH#2 and the failure indication (described with respect to FIG. 3) may be used so ongoing transmission of PUSCH#1 is not interrupted and the PDU for PUSCH#2 is not lost.

According to aspects of the present disclosure, the MAC layer may be aware of the time Np. Thus, the MAC layer can re-prioritize the PDUs on its own. In this case, the MAC layer may trigger the retransmission procedure based on when the second PDU would be sent. In another configuration, the MAC layer does not send the second PDU when it calculates the second PDU would fall into the region 44.

Capabilities of the UE, such as a timeline-related capability, may be considered. In this case, different UEs may have different values of the prioritization time Np. A small time Np results in a very small (or non-existent) region 44.

Figure 5:
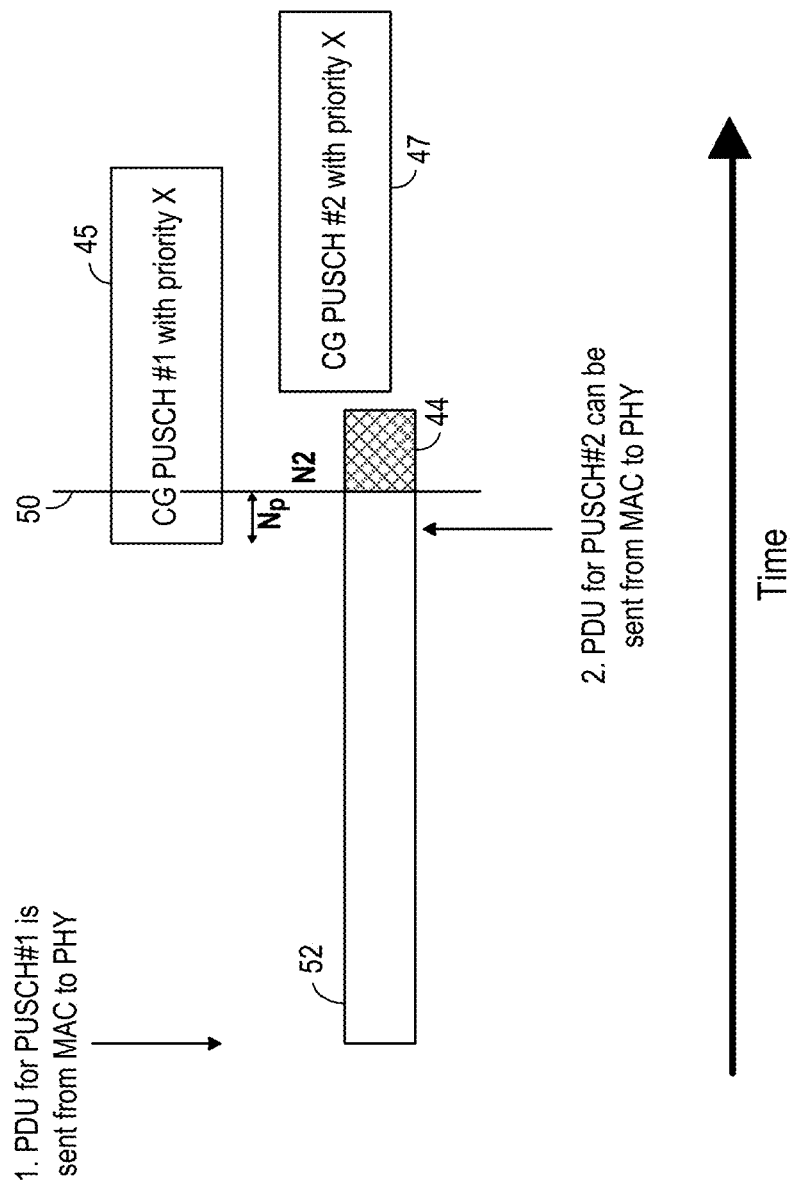
FIG. 5 is a timing diagram illustrating a timeline for PHY layer collision handling, in accordance with aspects of the present disclosure.

FIG. 5 is a timing diagram illustrating a timeline for PHY layer collision handling, in accordance with aspects of the present disclosure. As seen in FIG. 5, the prioritization time Np may have a negative value. In this case, a region 52 overlaps in time with the first CG occasion 45 (CG PUSCH#1) as indicated by reference number 50. In the example shown in FIG. 5, the MAC layer transmits the first and second PDUs at times 1 and 2, respectively, as described with respect to FIG. 4. In the example of FIG. 5, however, the MAC layer sends the second PDU during the first CG occasion 45 (CG PUSCH #1). In this case, an in-preparation or ongoing transmission of PUSCH#1 is interrupted. The PDU for PUSCH#1 can be recovered by the MAC layer using retransmission of de-prioritized grants, as described with respect to FIG. 3.

For a UE with a small prioritization time Np (as opposed to a negative time Np as shown in FIG. 5), the PUSCH#2 can arrive late at the PHY layer, from the MAC layer, interrupting an in-preparation or ongoing PUSCH#1 transmission. The PDU for PUSCH#1 can be recovered by the MAC layer using retransmission procedures for de-prioritized grants.

The capability associated with the prioritization time Np may be specific to the case of PUSCH#1 and PUSCH#2 having a same priority at the PHY layer but a different priority at the MAC layer, as discussed previously. In other words, if the priority is different, the time Np may have different values. Signaling of the capability to a network entity, such as a base station, may take different forms. For example, support for a prioritization time Np=0 can be a binary value for signaling purposes. In another configuration, a three level indicator, such as less than zero, zero, or more than zero may be signaled.

As indicated above, FIGS. 3-5 are provided as examples. Other examples may differ from what is described with respect to FIGS. 3-5.

Figure 6:
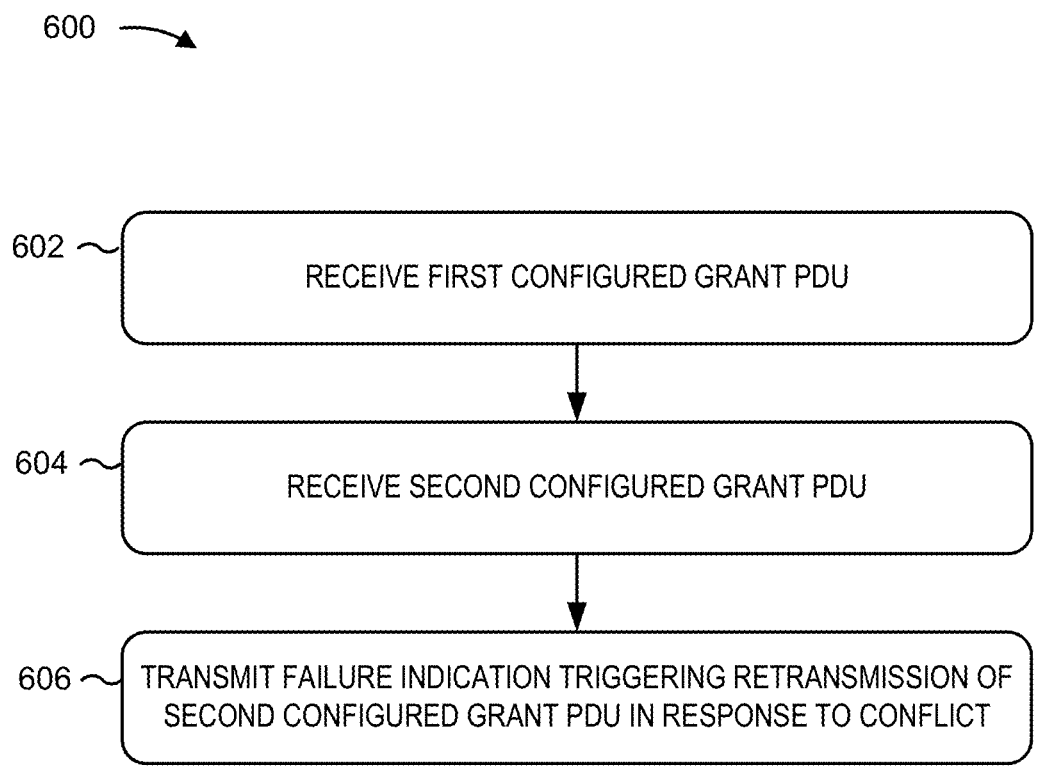
FIG. 6 is a flow chart showing an exemplary process for PHY (physical) layer collision handling in a user equipment (UE), in accordance with aspects of the present disclosure.

FIG. 6 is a flow chart showing an exemplary process for PHY (physical) layer collision handling in a user equipment (UE), in accordance with aspects of the present disclosure. In FIG. 6, a method 600 for handling collisions at the PHY layer is shown. The operations of the method 600 may be implemented by a UE 120 or its components as described with reference to FIG. 2. In some examples, the UE 120 may execute a set of codes to control the functional elements of the device to perform the functions described below.

At block 602, a PHY layer of the UE may receive a first configured grant PDU from the MAC layer of the UE. In some aspects, the MAC layer may deliver a PDU associated with a first configured grant (CG-1) for transmission at a next available CG occasion. At block 604, the PHY layer may receive a second configured grant PDU from the MAC layer. In some aspects, the MAC layer may deliver a PDU associated with a second configured grant before the PHY layer completes transmission of the PDU associated with the first configured grant CG-1. As a result of the timing of the MAC layer sending the PDU associated with the second configured grant PDU, a conflict arises. For example, the UE may determine when the second configured grant PDU was sent with respect to the first CG occasion. If the second configured grant PDU was sent more than prioritization time Np prior to the first CG occasion, no conflict exists. If the second configured grant was sent less than time Np before the first CG occasion, a conflict exists.

At block 606, the PHY layer transmits to the MAC layer, a failure indication for the second configured grant PDU when a conflict is detected. The failure indication triggers, at the MAC layer, a retransmission procedure for the second configured grant PDU when the conflict exists. For example, the MAC layer may send the PDU associated with the second configured grant to the PHY layer for transmission at the next available configured grant occasion. Thus, the UE is able to recover PDUs at the MAC layer for a PDU the PHY layer was unable to transmit.

Implementation examples are described in the following numbered clauses.

1. A method for wireless communication at a UE (user equipment), comprising:
  receiving, from a MAC (media access control) layer, a first configured grant PDU (protocol data unit);
  receiving, from the MAC layer, a second configured grant PDU; and
  transmitting from a PHY (physical) layer to the MAC layer, a failure indication for the second configured grant PDU when a conflict exists between the first configured grant PDU and the second configured grant PDU, the failure indication triggering a retransmission procedure, at the MAC layer, for the second configured grant PDU.
2. The method of clause 1, in which the MAC layer receives the failure indication in response to a partial transmission of the second configured grant PDU by the PHY layer.
3. The method of clause 1 or 2, in which the PHY layer determines the conflict exists when the second configured grant PDU is received while the PHY layer is transmitting the first configured grant PDU.
4. The method of clause 1 or 2, in which the PHY layer determines the conflict exists when the second configured grant PDU is received while the PHY layer is preparing the first configured grant PDU for transmission.
5. The method of clause 1 or 2, in which the PHY layer determines the conflict exists when the second configured grant PDU was received less than a prioritization time Np before an occasion associated with the first configured grant PDU.
6. The method of clause 1, 2, or 5, in which the prioritization time Np is a minimum processing timeline for a carrier of interest.
7. The method of any of clauses 1, 2, 5, or 6, in which the prioritization time Np is different for different UEs.
8. The method of any of clauses 1, 2, 5, 6, or 7, in which the prioritization time Np depends on whether the first configured grant PDU and the second configured grant PDU have a same PHY priority but a different MAC priority.
9. The method of any of clauses 1, 2, 5, 6, 7, or 8, further comprising signaling, to a network node, a UE capability associated with the prioritization time Np.
10. The method of any of clauses 1, 2, 6, 7, 8, or 9, in which the PHY layer determines the conflict exists when the second configured grant PDU was received less than a prioritization time Np before an occasion associated with the first configured grant PDU, the method further comprising:
  interrupting PHY layer transmission of the first configured grant PDU;
  transmitting the second configured grant PDU; and
  triggering the retransmission procedure for the first configured grant PDU.
11. An apparatus of a UE (user equipment) for wireless communication, comprising:
  a memory, and
  at least one processor operatively coupled to the memory, the memory and the at least one processor configured:
    to receive, from a MAC (media access control) layer, a first configured grant PDU (protocol data unit);
    to receive, from the MAC layer, a second configured grant PDU; and
    to transmit from a PHY (physical) layer to the MAC layer, a failure indication for the second configured grant PDU when a conflict exists between the first configured grant PDU and the second configured grant PDU, the failure indication triggering a retransmission procedure, at the MAC layer, for the second configured grant PDU.
12. The apparatus of clause 11, in which the at least one processor is further configured to receive the failure indication at the MAC layer in response to a partial transmission of the second configured grant PDU by the PHY layer.
13. The apparatus of clause 11 or 12, in which the at least one processor is further configured to determine the conflict exists when the second configured grant PDU is received while the PHY layer is transmitting the first configured grant PDU.
14. The apparatus of clause 11 or 12, in which the at least one processor is further configured to determine the conflict exists when the second configured grant PDU is received while the PHY layer is preparing the first configured grant PDU for transmission.
15. The apparatus of clause 11 or 12, in which the at least one processor is further configured to determine the conflict exists when the second configured grant PDU was received less than a prioritization time Np before an occasion associated with the first configured grant PDU.

16. The apparatus of any of the clauses 11, 12, or 15, in which the prioritization time Np is a minimum processing timeline for a carrier of interest.
17. The apparatus of any of the clauses 11, 12, 15, or 16, in which the prioritization time Np is different for different UEs.
18. The apparatus of any of the clauses 11, 12, 15, 16, or 17, in which the prioritization time Np depends on whether the first configured grant PDU and the second configured grant PDU have a same PHY priority but a different MAC priority.
19. The apparatus of any of the clauses 11, 12, 15, 16, 17, or 18, in which the at least one processor is further configured to signal, to a network node, a UE capability associated with the prioritization time Np.
20. The apparatus of any of the clauses 11, 12, 15, 16, 17, 18, or 19, in which the PHY layer determines the conflict exists when the second configured grant PDU was received less than a prioritization time Np before an occasion associated with the first configured grant PDU, and in which the at least one processor is further configured:
to interrupt PHY layer transmission of the first configured grant PDU;
to transmit the second configured grant PDU; and
to trigger the retransmission procedure for the first configured grant PDU.

The foregoing disclosure provides illustration and description, but is not intended to be exhaustive or to limit the aspects to the precise form disclosed. Modifications and variations may be made in light of the above disclosure or may be acquired from practice the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a UE (user equipment), comprising:
receiving, from a MAC (media access control) layer, a first configured grant PDU (protocol data unit);
receiving, from the MAC layer, a second configured grant PDU; and
transmitting from a PHY (physical) layer to the MAC layer, a failure indication for the second configured grant PDU when a conflict exists between the first configured grant PDU and the second configured grant PDU, the failure indication triggering a retransmission procedure, at the MAC layer, for the second configured grant PDU, the conflict arising when the PHY layer receives the second configured grant PDU less than a prioritization time Np before an occasion associated with the first configured grant PDU.

2. The method of claim 1, in which the MAC layer receives the failure indication in response to a partial transmission of the second configured grant PDU by the PHY layer.

3. The method of claim 1, in which the PHY layer determines the conflict exists when the second configured grant PDU is received while the PHY layer is transmitting the first configured grant PDU.

4. The method of claim 1, in which the PHY layer determines the conflict exists when the second configured grant PDU is received while the PHY layer is preparing the first configured grant PDU for transmission.

5. The method of claim 1, in which the prioritization time Np is a minimum processing timeline for a carrier of interest.

6. The method of claim 1, in which the prioritization time Np is different for different UEs.

7. The method of claim 1, in which the prioritization time Np depends on whether the first configured grant PDU and the second configured grant PDU have a same PHY priority but a different MAC priority.

8. The method of claim 1, further comprising signaling, to a network node, a UE capability associated with the prioritization time Np.

9. The method of claim 1, further comprising:
interrupting PHY layer transmission of the first configured grant PDU;
transmitting the second configured grant PDU; and
triggering the retransmission procedure for the first configured grant PDU.

10. An apparatus of a UE (user equipment) for wireless communication, comprising:
a memory, and at least one processor operatively coupled to the memory, the memory and the at least one processor configured:
  to receive, from a MAC (media access control) layer, a first configured grant PDU (protocol data unit);
  to receive, from the MAC layer, a second configured grant PDU; and
  to transmit from a PHY (physical) layer to the MAC layer, a failure indication for the second configured grant PDU when a conflict exists between the first configured grant PDU and the second configured grant PDU, the failure indication triggering a retransmission procedure, at the MAC layer, for the second configured grant PDU, the conflict arising when the PHY layer receives the second configured grant PDU less than a prioritization time Np before an occasion associated with the first configured grant PDU.

11. The apparatus of claim 10, in which the at least one processor is further configured to receive the failure indication at the MAC layer in response to a partial transmission of the second configured grant PDU by the PHY layer.

12. The apparatus of claim 10, in which the at least one processor is further configured to determine the conflict exists when the second configured grant PDU is received while the PHY layer is transmitting the first configured grant PDU.

13. The apparatus of claim 10, in which the at least one processor is further configured to determine the conflict exists when the second configured grant PDU is received while the PHY layer is preparing the first configured grant PDU for transmission.

14. The apparatus of claim 10, in which the prioritization time Np is a minimum processing timeline for a carrier of interest.

15. The apparatus of claim 10, in which the prioritization time Np is different for different UEs.

16. The apparatus of claim 10, in which the prioritization time Np depends on whether the first configured grant PDU and the second configured grant PDU have a same PHY priority but a different MAC priority.

17. The apparatus of claim 10, in which the at least one processor is further configured to signal, to a network node, a UE capability associated with the prioritization time Np.

18. The apparatus of claim 10, in which the at least one processor is further configured:
  to interrupt PHY layer transmission of the first configured grant PDU;
  to transmit the second configured grant PDU; and
  to trigger the retransmission procedure for the first configured grant PDU.

* * * * *